(12) United States Patent
Karayev et al.

(10) Patent No.: US 11,487,823 B2
(45) Date of Patent: Nov. 1, 2022

(54) RELEVANCE OF SEARCH RESULTS

(71) Applicant: SAP SE, Walldorf (DE)

(72) Inventors: Michael Karayev, Cupertino, CA (US);
Amlan Chatterjee, Palo Alto, CA (US);
Lakshmi Gayatri Niharika Bollapragada, Palo Alto, CA (US);
Shreya Jain, Palo Alto, CA (US)

(73) Assignee: SAP SE, Walldorf (DE)

( * ) Notice: Subject to any disclaimer, the term of this patent is extended or adjusted under 35 U.S.C. 154(b) by 115 days.

(21) Appl. No.: 16/202,581

(22) Filed: Nov. 28, 2018

(65) Prior Publication Data

US 2020/0167433 A1    May 28, 2020

(51) Int. Cl.
*G06N 3/08* (2006.01)
*G06F 16/903* (2019.01)
*G06F 16/9032* (2019.01)

(52) U.S. Cl.
CPC .... *G06F 16/90335* (2019.01); *G06F 16/9032* (2019.01); *G06N 3/08* (2013.01)

(58) Field of Classification Search
CPC .......... G06F 16/90335; G06F 16/9032; G06F 16/90344; G06F 16/9532; G06N 3/08; G06N 3/02
USPC ........................................................ 707/759
See application file for complete search history.

(56) References Cited

U.S. PATENT DOCUMENTS 10,229,164 B1 *  3/2019  Hampson .......... G06F 16/24578
10,423,999 B1 *  9/2019  Doctor ............... G06Q 30/0601
11,004,135 B1 *  5/2021  Sandler ................... G06N 3/084
2006/0080321 A1 *  4/2006  Horn .................... G06F 16/9535
2006/0117002 A1 *  6/2006  Swen ................... G06F 16/353
2008/0097982 A1  4/2008  Gupta
2012/0284105 A1 * 11/2012  Li ........................ G06Q 30/06
                                                          705/14.23
2014/0351078 A1 * 11/2014  Kaplan .............. G06Q 30/0631
                                                          705/26.7
2015/0340032 A1 * 11/2015  Gruenstein ............. G06N 3/08
                                                          704/232
2017/0011117 A1 *  1/2017  Jiang .................... G06F 40/253
2018/0089332 A1 *  3/2018  DeLuca ............... G06F 40/274
2018/0276507 A1 *  9/2018  Marchezi ............ G06F 16/3334
2019/0065589 A1 *  2/2019  Wen ........................ G06F 16/35

(Continued)

OTHER PUBLICATIONS

Extended European Search Report for EP Application No. 19211197, dated Mar. 19, 2020, 19 pages.

*Primary Examiner* — Hicham Skhoun
(74) *Attorney, Agent, or Firm* — Fountainhead Law Group P.C.

(57) ABSTRACT

Some embodiments provide a program. The program receives from a client device a request for objects in a collection of objects and a set of keywords. Based on the set of keywords, the program further determines a set of categories used for categorizing objects in the collection of objects. The program also generates a search query based on the set of keywords and the set of categories. The search query is configured to identify objects in the collection of objects having a description or name that matches at least one keyword in the set keywords and modify relevance of identified objects based on the set of categories. The program further executes the search query on the collection of objects to generate a result set of objects. The program also provides the result set of objects to the client device.

20 Claims, 7 Drawing Sheets

(56) References Cited

U.S. PATENT DOCUMENTS

| | | | |
|---|---|---|---|
| 2019/0138616 A1* | 5/2019 | Parameshwara | G06N 3/08 |
| 2019/0205761 A1* | 7/2019 | Wu | G06F 16/3344 |
| 2019/0325212 A1* | 10/2019 | Liu | G06F 17/18 |
| 2019/0385054 A1* | 12/2019 | Zuev | G06F 40/131 |
| 2020/0019609 A1* | 1/2020 | Yu | G06F 40/186 |
| 2020/0043602 A1* | 2/2020 | Kim | G06N 20/00 |
| 2020/0125898 A1* | 4/2020 | Zuev | G06N 3/08 |
| 2020/0159754 A1* | 5/2020 | Mutalikdesai | G06N 5/02 |

* cited by examiner

FIG. 1

| Item ID | Name | Description | Product Category | Relevance Score |
|---|---|---|---|---|
| 45 | Cable for mobile phone | USB cable for charging mobile phones | Mobile phone cables | 88 |
| 1013 | Wireless headphones | Headphones for use with laptops, desktops, mobile phones, & audio players. | Headphones | 86 |
| 178 | Mobile phone case | Red mobile phone case | Mobile phone cases | 85 |
| 44 | Stylus | Stylus for use with tablets and mobile phones | Input tools | 82 |
| 1104 | Mobile phone screen protector | Mobile phone screen protector that can be used with most cases | Screen protectors | 77 |
| 290 | Phone case | Case for protecting cellphones | Mobile phone cases | 76 |
| 65 | Travel suitcase | Compact suitcase with built-in charger for mobile phones | Luggage | 75 |
| 281 | Leather mobile phone case | Brown leather case for mobile phone | Mobile phone cases | 73 |
| 1165 | Camera case | Can hold camera body and several lenses | Camera Accessories | 68 |
| 510 | Medium tool case | Medium-sized case for storing tools | Toolboxes | 59 |

RELEVANCE OF SEARCH RESULTS

BACKGROUND

Search engines are tools used to search for information stored on computing systems, databases, networks, etc. In some cases, a search engine may examine the data stored on the computing systems to collect information about the data and build an index. When such a search engine receives a search query from a user, the search engine uses the index to determine results for the search query. Different search engines can use different techniques to find relevant information to the search query. For example, some search engines use natural language processing techniques. Some search engines may use full-text searching techniques. Other search engines (e.g., visual search engines) can use metadata. Many other techniques are possible.

SUMMARY

In some embodiments, a non-transitory machine-readable medium stores a program. The program receives from a client device a request for objects in a collection of objects and a set of keywords. Based on the set of keywords, the program further determines a set of categories used for categorizing objects in the collection of objects. The program also generates a search query based on the set of keywords and the set of categories. The search query is configured to identify objects in the collection of objects having a description or name that matches at least one keyword in the set keywords and modify relevance of identified objects based on the set of categories. The program further executes the search query on the collection of objects to generate a result set of objects. The program also provides the result set of objects to the client device.

In some embodiments, determining the set of categories may include determining a mapping that maps sets of keywords to categories. The mapping may be determined using a neural network model generated based on a set of event that have occurred. Each event in the set of events may include a set of keywords, a particular collection of objects, an object in the particular collection of objects, and an action performed on the object. The set of events may be a first set of events. The program may further receive a second set of events and train the neural network model using the second set of events. The mapping may further map the sets of keywords to the categories and confidence scores associated with the categories.

In some embodiments, the search query may be configured to modify relevance of objects in the result set of objects by increasing the relevance of objects having commodity codes that match at least one category in the set of categories. Increasing the relevance of the objects having categories that match at least one category in the set of categories may include increasing the relevance of the objects based on a defined weight value.

In some embodiments, a method, executable by a device, receives from a client device a request for objects in a collection of objects and a set of keywords. Based on the set of keywords, the method further determines a set of categories used for categorizing objects in the collection of objects. The method also generates a search query based on the set of keywords and the set of categories. The search query is configured to identify objects in the collection of objects having a description or name that matches at least one keyword in the set keywords and modify relevance of identified objects based on the set of categories. The method further executes the search query on the collection of objects to generate a result set of objects. The method also provides the result set of objects to the client device.

In some embodiments, determining the set of categories may include determining a mapping that maps sets of keywords to categories. The mapping may be determined using a neural network model generated based on a set of event that have occurred. Each event in the set of events may include a set of keywords, a particular collection of objects, an object in the particular collection of objects, and an action performed on the object. The set of events may be a first set of events. The method may further receive a second set of events and train the neural network model using the second set of events. The mapping may further map the sets of keywords to the categories and confidence scores associated with the categories.

In some embodiments, the search query may be configured to modify relevance of objects in the result set of objects by increasing the relevance of objects having commodity codes that match at least one category in the set of categories. Increasing the relevance of the objects having categories that match at least one category in the set of categories may include increasing the relevance of the objects based on a defined weight value.

In some embodiments, a system includes a set of processing units and a non-transitory machine-readable medium that stores instructions. The instructions cause at least one processing unit to receive from a client device a request for objects in a collection of objects and a set of keywords. Based on the set of keywords, the instructions further cause the at least one processing unit to determine a set of categories used for categorizing objects in the collection of objects. The instructions also cause the at least one processing unit to generate a search query based on the set of keywords and the set of categories. The search query is configured to identify objects in the collection of objects having a description or name that matches at least one keyword in the set keywords and modify relevance of identified objects based on the set of categories. The instructions further cause the at least one processing unit to execute the search query on the collection of objects to generate a result set of objects. The instructions also cause the at least one processing unit to provide the result set of objects to the client device.

In some embodiments, determining the set of categories may include determining a mapping that maps sets of keywords to categories. The mapping may be determined using a neural network model generated based on a set of event that have occurred. Each event in the set of events may include a set of keywords, a particular collection of objects, an object in the particular collection of objects, and an action performed on the object. The set of events may be a first set of events. The instructions may further cause the at least one processing unit to receive a second set of events and train the neural network model using the second set of events. The mapping may further map the sets of keywords to the categories and confidence scores associated with the categories. The search query may be configured to modify relevance of objects in the result set of objects by increasing the relevance of objects having commodity codes that match at least one category in the set of categories.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for improving relevance of search results based on categories (e.g., product categories). In some embodiments, a computing system may receive from a client device search terms (e.g., a set of keywords) for finding relevant items in a catalog of items. The computing system then uses determines a set of product categories that are used to categorize items in the catalog of items based on the set of keywords. Next, the computing system generates a search query based on the search terms and the determined set of product categories. The search query is configured to identify items in the catalog of items that have metadata (e.g., name, description, etc.) that match some or all of the search terms. The search query is also configured to modify the relevance of items in the search results that are categorized in one of the product categories in the determined set of product categories. The computing system executes the search query to generate the search results and then sends the search results to the client device.

The techniques described herein provide a number of benefits and advantages over conventional methods of generating search results. For example, by using product categories that are determined based on the search terms, the computing system is able to improve the relevancy of items in the search results that are in the same product categories as the determined product categories. As a result, items in the search results that might otherwise have lower relevance and, thus, would be presented lower down in the list of search results, are instead presented higher in the list of search result. In this manner, users are able to find desired items faster because less time is spent scrolling through search results, refining the search terms, or trying new search terms.

Figure 1:
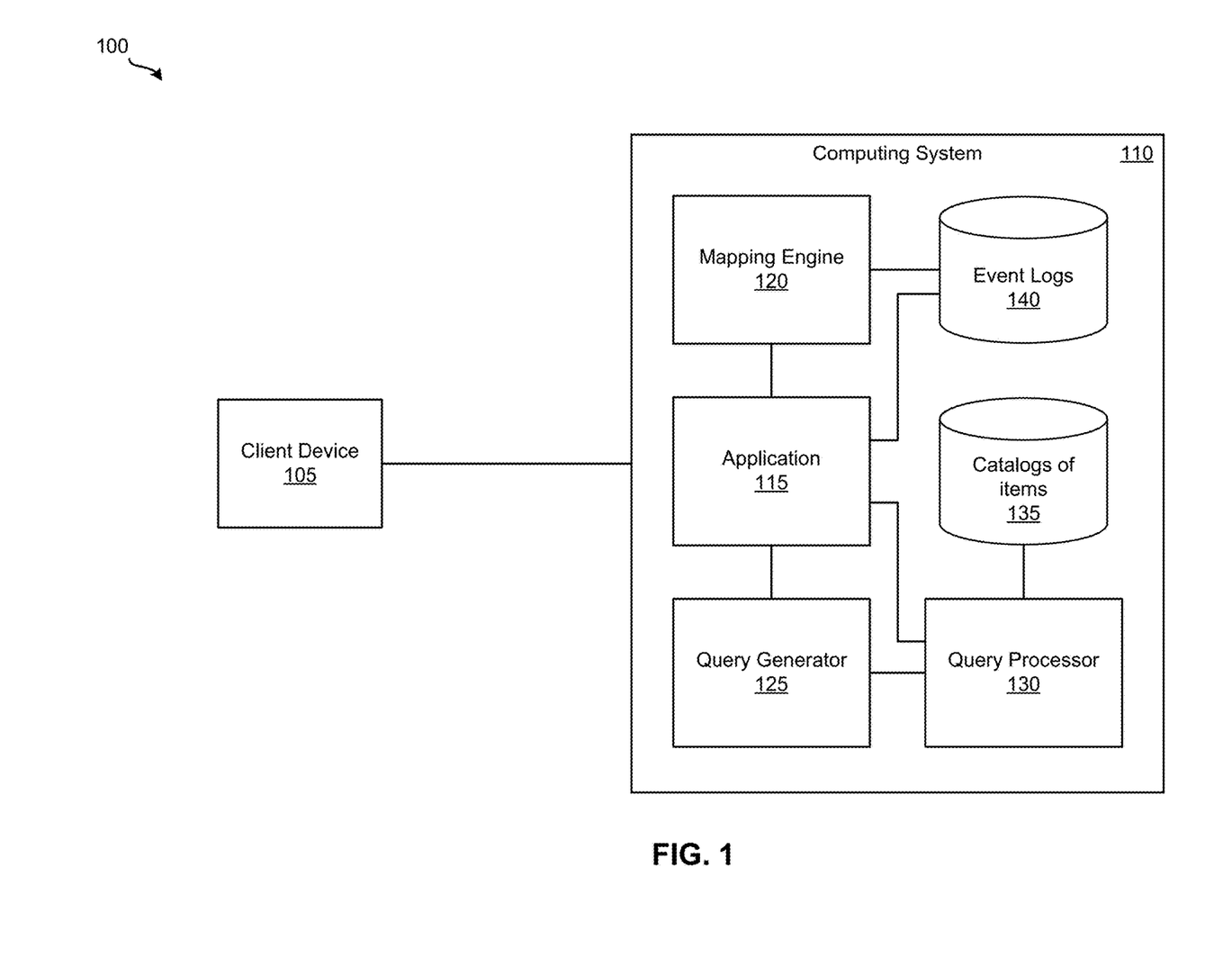
FIG. 1 illustrates a system for improving relevance of search results according to some embodiments.

FIG. 1 illustrates a system 100 for improving relevance of search results according to some embodiments. As shown, system 100 includes client devices 105 and computing system 110. Client devices 105 is configured to communicate and interact with computing system 110. For instance, a user of a client device 105 may access application 115 (e.g., via a browser operating on client device 105) and send application 115 a set of keywords and a request for items in a catalog of items. In return, client device 105 can receive from computing system 110 search results for the request that includes a list of items. The user of client device 105 may perform any number of different operations on the search results. For example, the user of client device 105 can scroll through the list of items, view details of individual items in the list of items, select items from the list of items to be added to a list of items to be purchased (e.g., a shopping cart), etc. While FIG. 1 shows one client device 105, one of ordinary skill in the art will realize that any number of additional client devices configured similarly to client device 105 may be included in system 100.

As illustrated in FIG. 1, computing system 110 includes application 115, mapping engine 120, query generator 125, query processor 130, catalogs of items storage 135, and event logs storage 140. Catalogs of items storage 135 is configured to store different catalogs of items. In some embodiments, a catalog of items is a collection of one or more items. Each item in a catalog of items may include a name of the item, a description of the item, a manufacturer of the item, a part number, a commodity code (e.g., a United Nations Standard Products and Services Code (UNSPSC) code) that represents a product category to which the item belongs, etc. Event logs storage 140 stores event logs of events that have occurred with respect to a set of keywords and application 115. In some embodiments, an event log includes a set of keywords, a catalog of items, an item in the catalog of items, and an action that was performed. Examples of actions may include viewing details of the item, adding the item to a list of items to be purchase, or any other type of action that indicates or suggests the item is a relevant result of the search generated from the set of keywords. In some embodiments, storages 135 and 140 are implemented in a single physical storage while, in other embodiments, storages 135 and 140 may be implemented across several physical storages. While FIG. 1 shows storages 135 and 140 as part of computing system 110, one of ordinary skill in the art will understand that storage 135 and/or storage 140 may be external to computing system 110 in some embodiments.

Application 115 may be a software application operating on (e.g., hosted on) computing system 110 that may be accessed by client device 105. Application 115 may be any number of different types of applications. For instance, application 115 may be an application for managing the procurement and selling of goods and services through a business network, an analytics application, a data management application, a human capital management application, an enterprise management application, a customer relationship management application, a financial management application, etc.

Application 115 is responsible for managing requests for items from catalogs of items. For example, application 115 may receive from client device 105 a request for items in a catalog of items and a set of keywords. In response, application 115 sends mapping engine 120 the set of keywords and a request for a set of product categories. In return, application 115 receives from mapping engine 120 the set of product categories and a set of confidence scores. Next, application 115 sends query generator 125 the set of keywords, the set of product categories, the set of associated confidence scores, and the catalog of items on which to search. In return, application 115 can receive search results for the request from query processor 130, which application 115 forwards to client device 105.

Application 115 is also responsible for capturing events that occur with respect to application 115. For example, if application 115 receives from client device 105 a request to view details of an item from search results, application 115 records an event log of this event in event logs storage 140. As mentioned above, in some embodiments, an event log includes a set of keywords, a catalog of items, an item in the catalog of items, and an action that was performed. For this example, the event log that application 115 records includes the set of keywords used to generate the search results, the catalog of items, the item in the catalog of items, and the action of viewing details of the item. As another example, if application 115 receives from client device 105 a selection of an item from search results to add to a list of items to be purchased, application 115 records an event log of this event in event logs storage 140. In this example, the event log that application 115 records includes the set of keywords used to generate the search results, the catalog of items, the item in the catalog of items, and the action of adding the item to a list of items to be purchased. One of ordinary skill in the art will appreciate that application 115 can capture any number of other events that indicate or suggest that an item is a relevant result of a search generated from a set of keywords.

Mapping engine 120 is configured to process request for product categories. For instance, mapping engine 120 can receive from application 115 a request for a set of product categories and a set of keywords. In response, mapping engine 120 determines the set of product categories based on the set of keywords. In some embodiments, mapping engine 120 determines the set of product categories by determining a mapping that maps the sets of keywords to a set of product categories. In some such embodiments, mapping engine 120 determines the mapping by using a neural network model that has been trained on events stored in event logs storage 140. In some embodiments, such a neural network model may include convolution neural network layers, fully connected neural network layers, or a combination thereof. In particular, mapping engine 120 provides the set of keywords as the inputs to the neural network model and receives a set of product categories and a set of confidence scores associated with the product categories in return. Each confidence score in the set of confidence scores is associated with a respective product category in the set of product categories. In some embodiments, the neural network model returns a defined number (e.g., three, five, ten, etc.) of product categories with the highest associated confidence scores. Once mapping engine 120 determines the set of product categories and the set of confidence scores, mapping engine 120 sends them to application 115.

Mapping engine 120 is also configured to manage the neural network model. For example, mapping engine 120 may initially train the neural network model using event logs stored in event logs storage 140. Then, at defined intervals (e.g., once a day, once a week, once a month, etc.), mapping engine 120 can continue to train the neural network model using newly added event logs stored in event logs storage 140 (e.g., event logs that have been added to event logs storage 140 since the last training of the neural network model).

Query generator 125 is responsible for generating search queries for items from catalogs of items stored in catalogs of items storage 135. For instance, query generator 125 may receive from application 115 a set of keywords, a set of product categories, a set of confidence scores associated with the set of product categories, and a catalog of items on which to search. In response, query generator 125 generates a search query for items from the catalog of items. Specifically, the search query that query generator 125 generates is configured to identify items in the catalog of items having a name or description that matches at least one keyword in the set keywords. In addition, the search query is further configured to modify the relevance of identified items by increasing the relevance of items having product categories (e.g., commodity codes) that match a product category in the set of product categories. In some embodiments, the search query is configured to modify the relevance of an item in the search results that has a product category matching a product category in the set of product categories by multiplying its relevance score by a boost factor. The boost factor may be a product of the confidence score associated with the matching product category and a defined weight value. Examples of a defined weight value may be the value of 10, 20, 50, 100, etc. After generating the search query, query generator 125 sends the search query to query processor 130 for execution.

Query processor 130 handles the processing of search queries. For example, query processor 130 can receive from query generator 125 a search query for items in a catalog of items stored in catalogs of items storage 135. Query processor 125 processes the query by accessing catalogs of items storage 135 and executing the search query on the catalog of items in order to generate search results for the search query. Then, query processor 130 sends the search results to application 115.

An example operation of system 100 will now be described by reference to FIGS. 1 and 3. In particular, the example operation is of improving the relevance of search results based on product categories. The example operation starts by a user of client device 105 sending application 115 and a request for items in a catalog of items and a set of keywords. In this example, the user wants to find mobile phone cases. Thus, the set of keywords for this example includes keywords "mobile," "phone," and "case." Upon receiving the request and the set of keywords, application 115 sends mapping engine 120 the set of keywords and a request for a set of product categories.

In response to receiving the set of keywords and the request, mapping engine 120 determines the set of product categories using a neural network model that has been trained on events stored in event logs storage 140 to determine a mapping that maps the sets of keywords to a set of product categories and a set of confidence scores associated with the product categories. Each confidence score in the set of confidence scores is associated with a respective product category in the set of product categories. For this example, the neural network model returns a defined number (e.g., three, five, ten, etc.) of product categories with the highest associated confidence scores. Next, mapping engine 120 sends the set of product categories and the set of confidence scores to application 115.

Then, application 115 sends query generator 125 the set of keywords, the set of product categories, the set of associated confidence scores, and the catalog of items on which to search. In response to receiving the set of keywords, the set of product categories, the set of confidence scores associated with the set of product categories, and the catalog of items on which to search, query generator 125 generates a search query for items from the catalog of items that is configured to identify items in the catalog of items having a name or description that matches at least one keyword in the set keywords and to modify the relevance of identified items by increasing the relevance of items having product categories (e.g., commodity codes) that match a product category in the set of product categories. In this example, the search query is configured to modify the relevance of an identified item that has a product category matching a product category in the set of product categories by multiplying its relevance score by a boost factor, which is a product of the confidence score associated with the matching product category and a defined weight value. Once the search query is generated, query generator 125 sends it to query processor 130 for execution.

To execute the search query, query processor 130, query processor 125 processes the query by accessing the catalog of items specified in the search query that is stored in catalogs of items storage 135. Then, query processor 130 identifies items in the catalog of items having a name or description that matches at least one keyword in the set keywords and modifies the relevance of identified items having product categories (e.g., commodity codes) that match a product category in the set of product categories by multiplying their respective relevance score by a corresponding boost factor. As explained above, the boost factor in this example is the product of the confidence score associated with the matching product category and a defined weight value. Next, query processor 130 generates search results for the search query. For this example, the search results include items in the catalog of items having a name or description that matches at least one keyword in the set keywords. The items in the search results are ordered according to their relevance score, from highest to lowest (e.g., items with higher relevance scores are listed higher/towards the beginning of the search results and items with higher relevance scores are listed lower/towards the end of the search results). Finally, query processor 130 sends the search results to application 115, which forwards them to client device 105.

Figure 2:
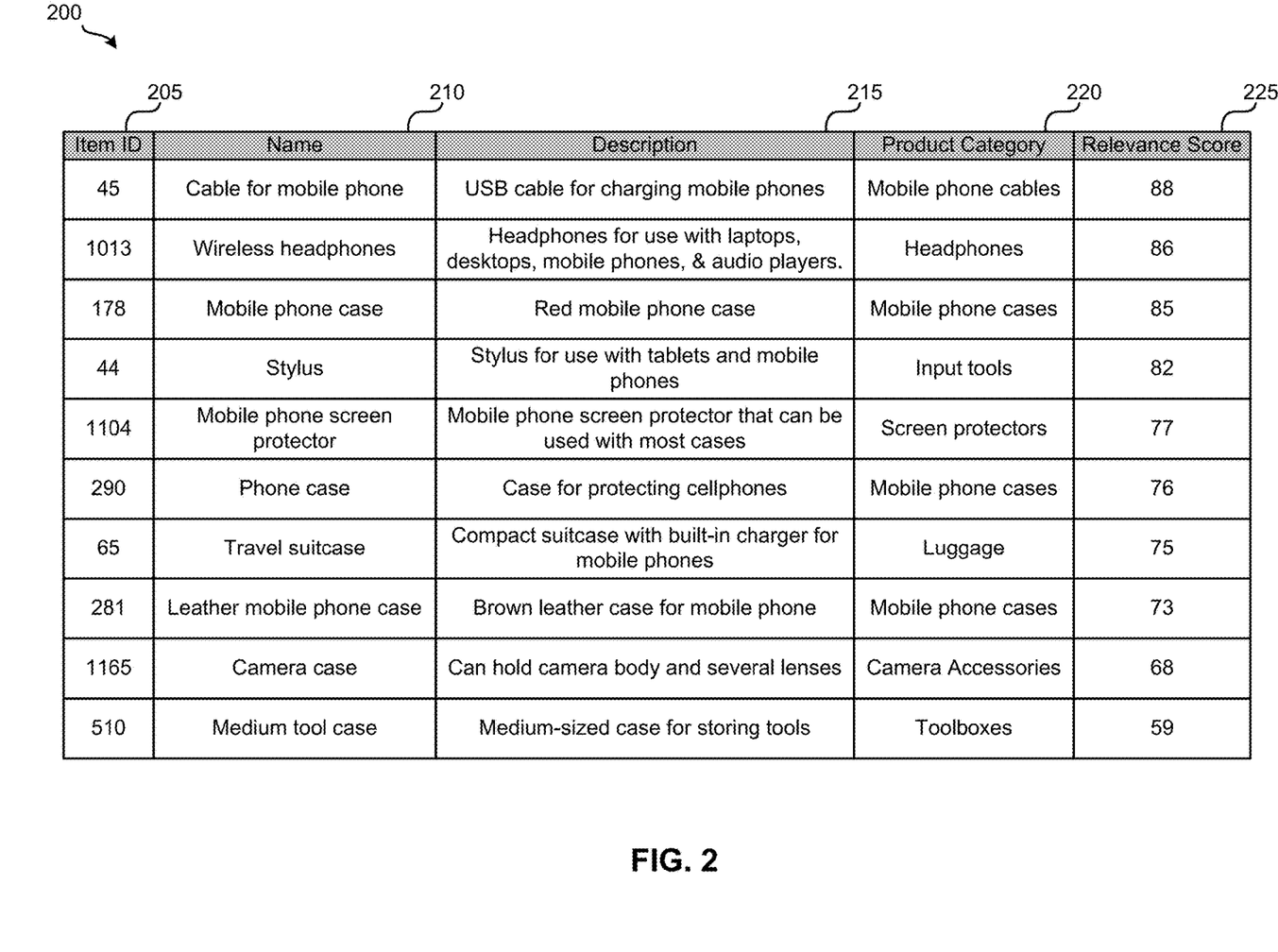
FIG. 2 illustrates an example search result according to some embodiments.

FIG. 2 illustrates an example search result 200 according to some embodiments. In particular, FIG. 2 illustrates search results for the search query in this example generated without modifying relevance scores of items based on product categories. As shown, search results 200 is a table that includes columns 205-225. Column 205 is configured to store a unique identifier (ID) of an item in the catalog of items, column 210 is configured to store a name of the item, column 215 is configured to store a description of the item, column 220 is configured to store a product category to which the item belongs, and column 225 is configured to store a relevance score of the item generated by query processor 130. Search results 200 includes ten items that are ordered by their relevance score from highest to lowest. As described above, the user of client device 105 in this example wants to find mobile phone cases using keywords "mobile," "phone," and "case." However, without modifying relevance scores of items based on product categories, the items with the highest relevance score in search results 200 are not mobile phone cases.

Figure 3:
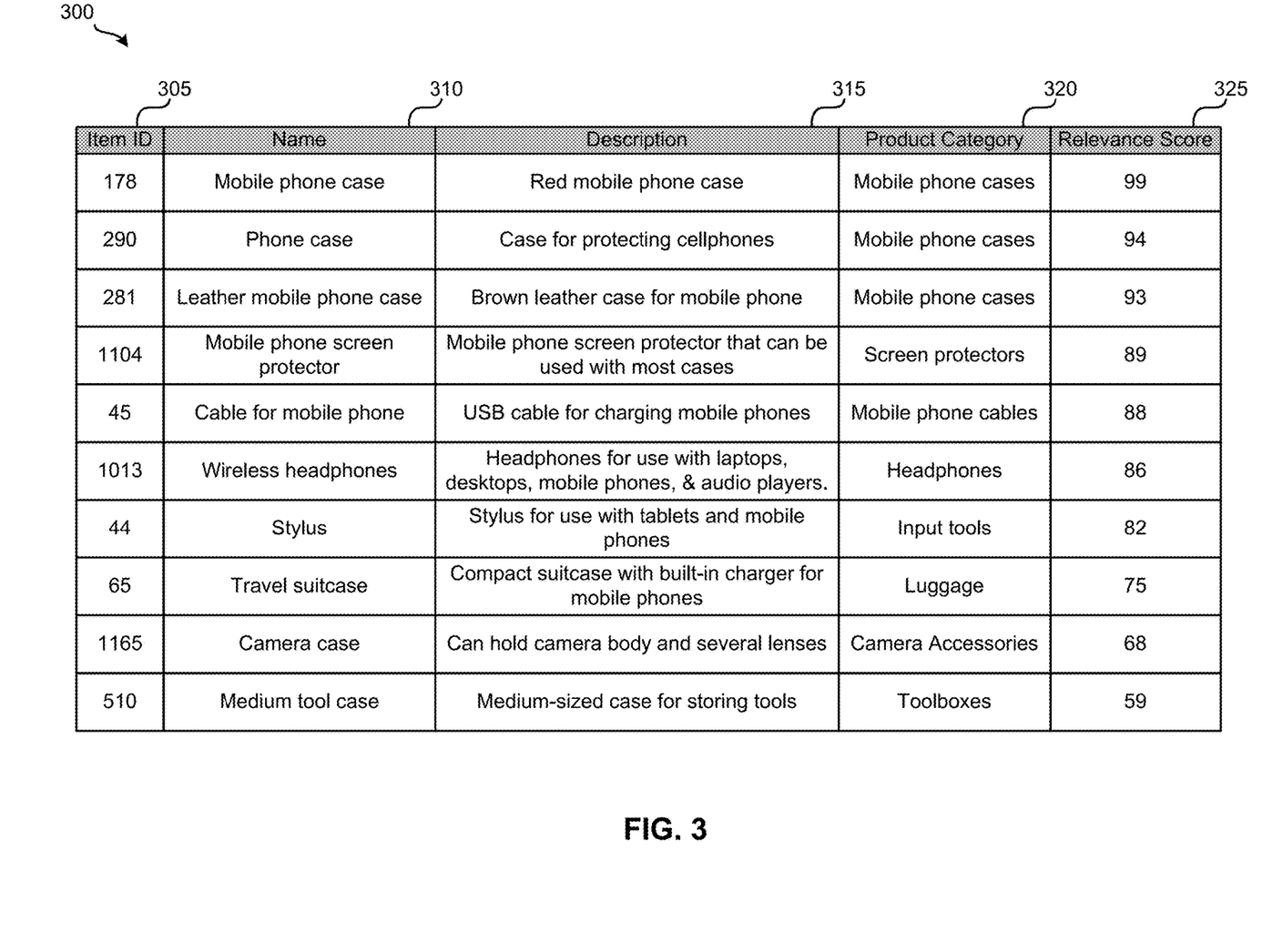
FIG. 3 illustrates an example search result with improved relevance according to some embodiments.

FIG. 3 illustrates an example search result 300 with improved relevance according to some embodiments. Specifically, FIG. 3 illustrates search results generated by query processor 130 for this example operation. That is, query processor 130 generated search results 300 by modifying relevance scores of items based on product categories. In this example, the set of product categories determined by mapping engine 120 includes the "mobile phone cases" product category and the "screen protector" product category. In addition, the confidence value of the former (e.g., 0.9) is higher than the confidence score of the latter (e.g., 0.65). As shown, search results 300 is a table that includes columns 305-325, which are similar to columns 205-225, respectively. The items in search results 300 are ordered by their relevance score from highest to lowest. Search results 300 includes the same ten items as search results 200 except some items in search results 300 have different relevance scores because they have been modified in the manner described above in this example operation. As shown, the relevance score of items that belong to the "mobile phone cases" product category and the "screen protector" product category have been increased by multiplying their relevance scores (i.e., the relevance scores shown in FIG. 2) by the respective confidence value and defined weight value. This way, items that are mobile phone cases and screen protectors are moved higher up in the search results, as illustrated by search results 300.

The product categories shown in FIGS. 2 and 3 are represented using plain text for purposes of simplicity and explanation. One of ordinary skill in the art will realize that commodity codes (e.g., UNSPSC codes) or the like may be used instead to represent the product categories.

Figure 4:
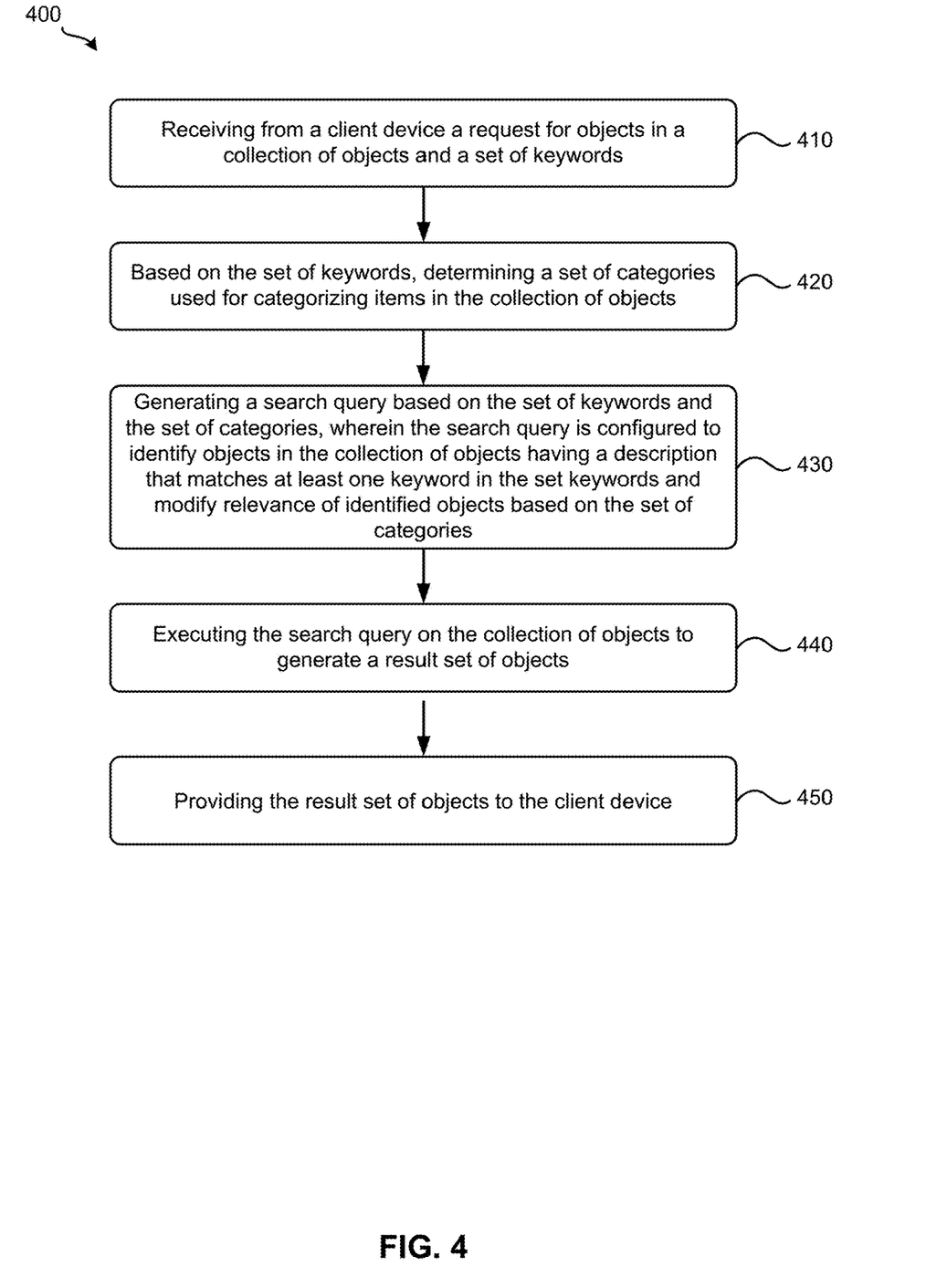
FIG. 4 illustrates a process for improving relevance of search results to some embodiments.

FIG. 4 illustrates a process 400 for improving relevance of search results according to some embodiments. In some embodiments, computing system 110 performs process 400. Process 400 begins by receiving, at 410, from a client device a request for objects (e.g., items) in a collects of objects (e.g., a catalog of items) and a set of keywords. Referring to FIG. 1 as an example, application 115 may receive from a user of client device 105 a request for items in a catalog of items and a set of keywords. In response, application 115 sends mapping engine 120 the set of keywords and a request a set of product categories.

Based on the set of keywords, process 400 determines, at 420, a set of categories (e.g., product categories) used for categorizing items in the collection of objects (e.g., the catalog of items). Referring to FIG. 1 as an example, mapping engine 120 determines the set of product categories. When mapping engine 120 receives the set of keywords from application 115, mapping engine 120 uses a neural network model that has been trained on events stored in event logs storage 140 to determine a mapping that maps the sets of keywords to a set of product categories and a set of confidence scores associated with the product categories. Each confidence score in the set of confidence scores is associated with a respective product category in the set of product categories. Mapping engine 120 then sends the set of product categories and the set of confidence scores to application 115.

Process 400 then generates, at 430, a search query based on the set of keywords and the set of categories (e.g., the set of product categories). The search query is configured to identify objects (e.g., items) in the collection of objects (e.g., the catalog of items) having a description that matches at least one keyword in the set keywords and modify relevance of identified objects (e.g., items) based on the set of categories (e.g., the set of product categories). Referring to FIG. 1 as an example, query generator 125 receives the set of product categories and the set of confidence scores from application. In response, query generator 125 generates the search query based on the set of keywords and the set of product categories. Query generator 125 then sends the search query to query processor 130.

Next, process 400 executes, at 440, the search query on the collection of objects (e.g., the catalog of items) to generate a result set of items. Referring to FIG. 1 as an example, query processor 130 executes the search query in order to generate the result set of items by accessing the catalog of items specified in the search query that is stored in catalogs of items storage 135, identifying items in the catalog of items having a name or description that matches at least one keyword in the set keywords, modifying the relevance of identified items having product categories (e.g., commodity codes) that match a product category in the set of product categories by multiplying their respective relevance score by a corresponding boost factor, and generates the result set of items (i.e., the search results for the search query). The boost factor may be the product of the confidence score associated with the matching product category and a defined weight value. Query processor 130 sends the search results to application 115. Finally, process 400 provides, at 450, the result set of items to the client device. Referring to FIG. 1 as an example, application 115 sends the result set of items to client device 105 for display on a display of client device 105.

Figure 5:
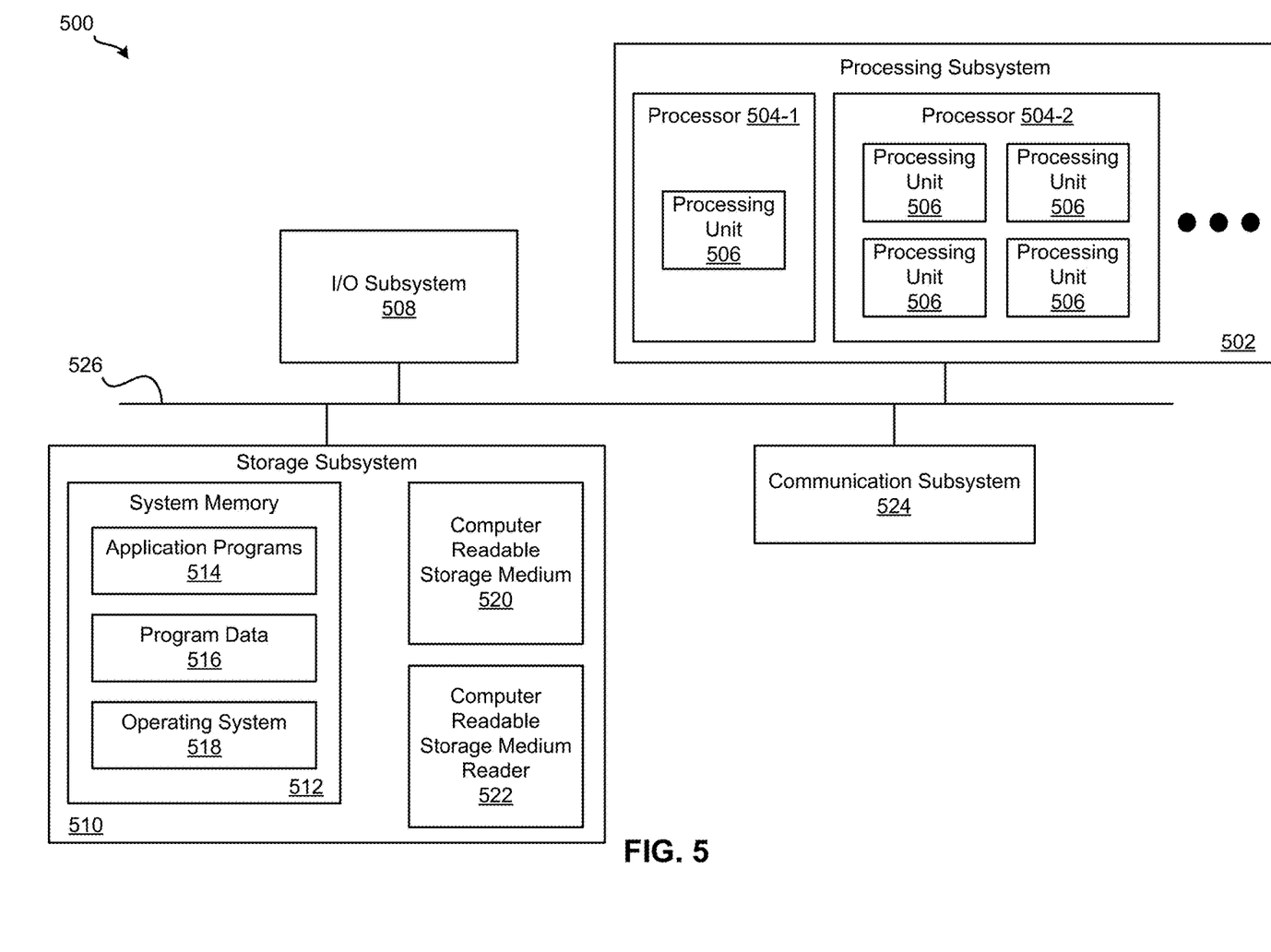
FIG. 5 illustrates an exemplary computer system, in which various embodiments may be implemented.

FIG. 5 illustrates an exemplary computer system 500 for implementing various embodiments described above. For example, computer system 500 may be used to implement client device 105 and computing system 110. Computer system 500 may be a desktop computer, a laptop, a server computer, or any other type of computer system or combination thereof. Some or all elements of application 115, mapping engine 120, query generator 125, query processor 130, or combinations thereof can be included or implemented in computer system 500. In addition, computer system 500 can implement many of the operations, methods, and/or processes described above (e.g., process 400). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504. Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to process 400, etc.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522. System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514 (e.g., application 115), program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Many of the components (e.g., application 115, mapping engine 120, query generator 125, and query processor 130) and/or processes (e.g., process 400) described above may be implemented as software that when executed by a processor or processing unit (e.g., a processor or processing unit of processing subsystem 502) performs the operations of such components and/or processes. Storage subsystem 510 may also store data used for, or generated during, the execution of the software.

Storage subsystem 510 may also include computer-readable storage medium reader 522 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
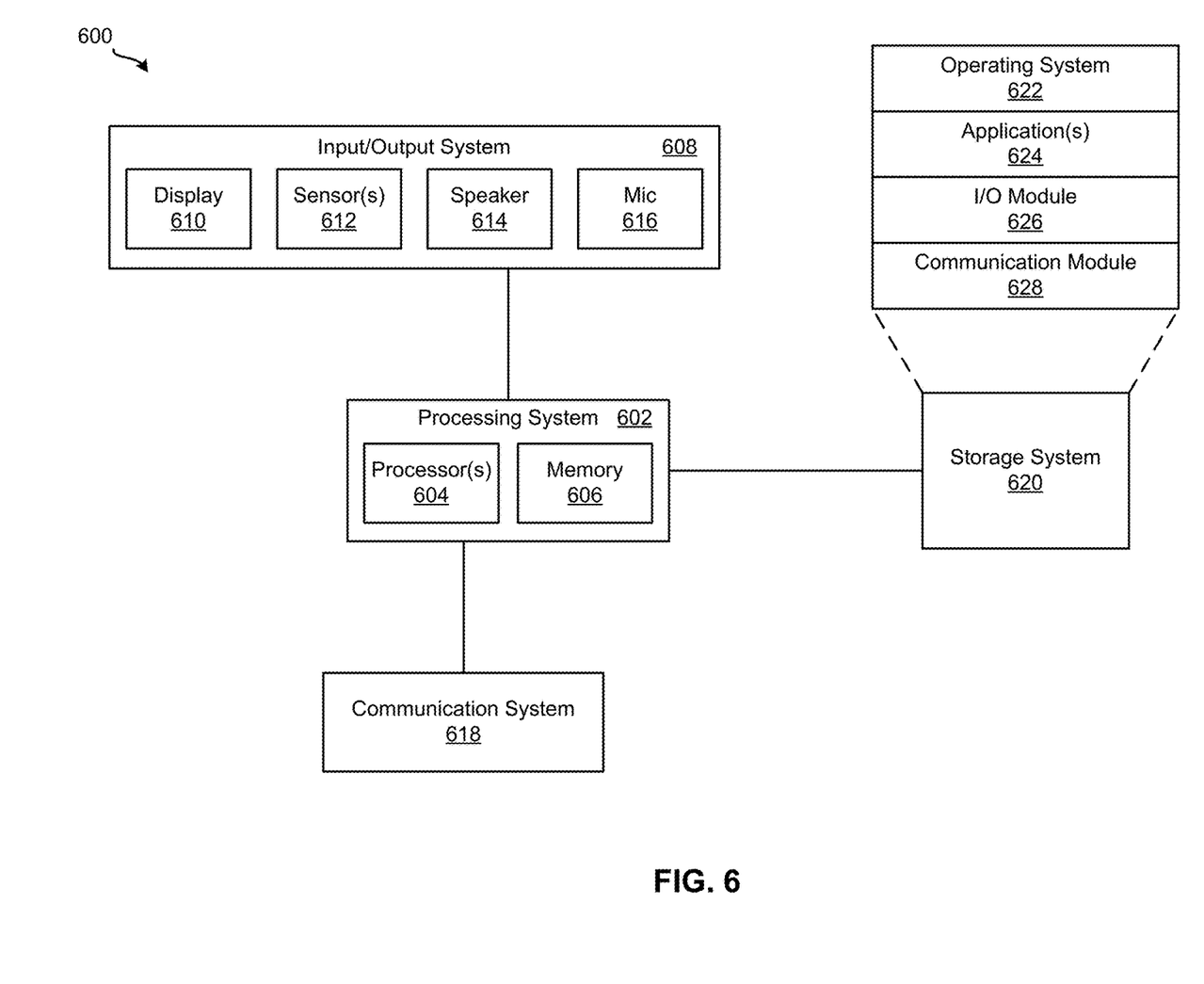
FIG. 6 illustrates an exemplary computing device, in which various embodiments may be implemented.

FIG. 6 illustrates an exemplary computing device 600 for implementing various embodiments described above. For example, computing device 600 may be used to implement client device 105. Computing device 600 may be a cellphone, a smartphone, a wearable device, an activity tracker or manager, a tablet, a personal digital assistant (PDA), a media player, or any other type of mobile computing device or combination thereof. As shown in FIG. 6, computing device 600 includes processing system 602, input/output (I/O) system 608, communication system 618, and storage system 620. These components may be coupled by one or more communication buses or signal lines.

Processing system 602, which can be implemented as one or more integrated circuits (e.g., a conventional microprocessor or microcontroller), controls the operation of computing device 600. As shown, processing system 602 includes one or more processors 604 and memory 606. Processors 604 are configured to run or execute various software and/or sets of instructions stored in memory 606 to perform various functions for computing device 600 and to process data.

Each processor of processors 604 may include one processing unit (e.g., a single core processor) or several processing units (e.g., a multicore processor). In some embodiments, processors 604 of processing system 602 may be implemented as independent processors while, in other embodiments, processors 604 of processing system 602 may be implemented as multiple processors integrate into a single chip. Still, in some embodiments, processors 604 of processing system 602 may be implemented as a combination of independent processors and multiple processors integrated into a single chip.

Memory 606 may be configured to receive and store software (e.g., operating system 622, applications 624, I/O module 626, communication module 628, etc. from storage system 620) in the form of program instructions that are loadable and executable by processors 604 as well as data generated during the execution of program instructions. In some embodiments, memory 606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 608 is responsible for receiving input through various components and providing output through various components. As shown for this example, I/O system 608 includes display 610, one or more sensors 612, speaker 614, and microphone 616. Display 610 is configured to output visual information (e.g., a graphical user interface (GUI) generated and/or rendered by processors 604). In some embodiments, display 610 is a touch screen that is configured to also receive touch-based input. Display 610 may be implemented using liquid crystal display (LCD) technology, light-emitting diode (LED) technology, organic LED (OLED) technology, organic electro luminescence (OEL) technology, or any other type of display technologies. Sensors 612 may include any number of different types of sensors for measuring a physical quantity (e.g., temperature, force, pressure, acceleration, orientation, light, radiation, etc.). Speaker 614 is configured to output audio information and microphone 616 is configured to receive audio input. One of ordinary skill in the art will appreciate that I/O system 608 may include any number of additional, fewer, and/or different components. For instance, I/O system 608 may include a keypad or keyboard for receiving input, a port for transmitting data, receiving data and/or power, and/or communicating with another device or component, an image capture component for capturing photos and/or videos, etc.

Communication system 618 serves as an interface for receiving data from, and transmitting data to, other devices, computer systems, and networks. For example, communication system 618 may allow computing device 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 618 may provide components configured for wired communication (e.g., Ethernet) in addition to or instead of components configured for wireless communication.

Storage system 620 handles the storage and management of data for computing device 600. Storage system 620 may be implemented by one or more non-transitory machine-readable mediums that are configured to store software (e.g., programs, code modules, data constructs, instructions, etc.) and store data used for, or generated during, the execution of the software.

In this example, storage system 620 includes operating system 622, one or more applications 624, I/O module 626, and communication module 628. Operating system 622 includes various procedures, sets of instructions, software components and/or drivers for controlling and managing general system tasks (e.g., memory management, storage device control, power management, etc.) and facilitates communication between various hardware and software components. Operating system 622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 624 can include any number of different applications installed on computing device 600. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 626 manages information received via input components (e.g., display 610, sensors 612, and microphone 616) and information to be outputted via output components (e.g., display 610 and speaker 614). Communication module 628 facilitates communication with other devices via communication system 618 and includes various software components for handling data received from communication system 618.

One of ordinary skill in the art will realize that the architecture shown in FIG. 6 is only an example architecture of computing device 600, and that computing device 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
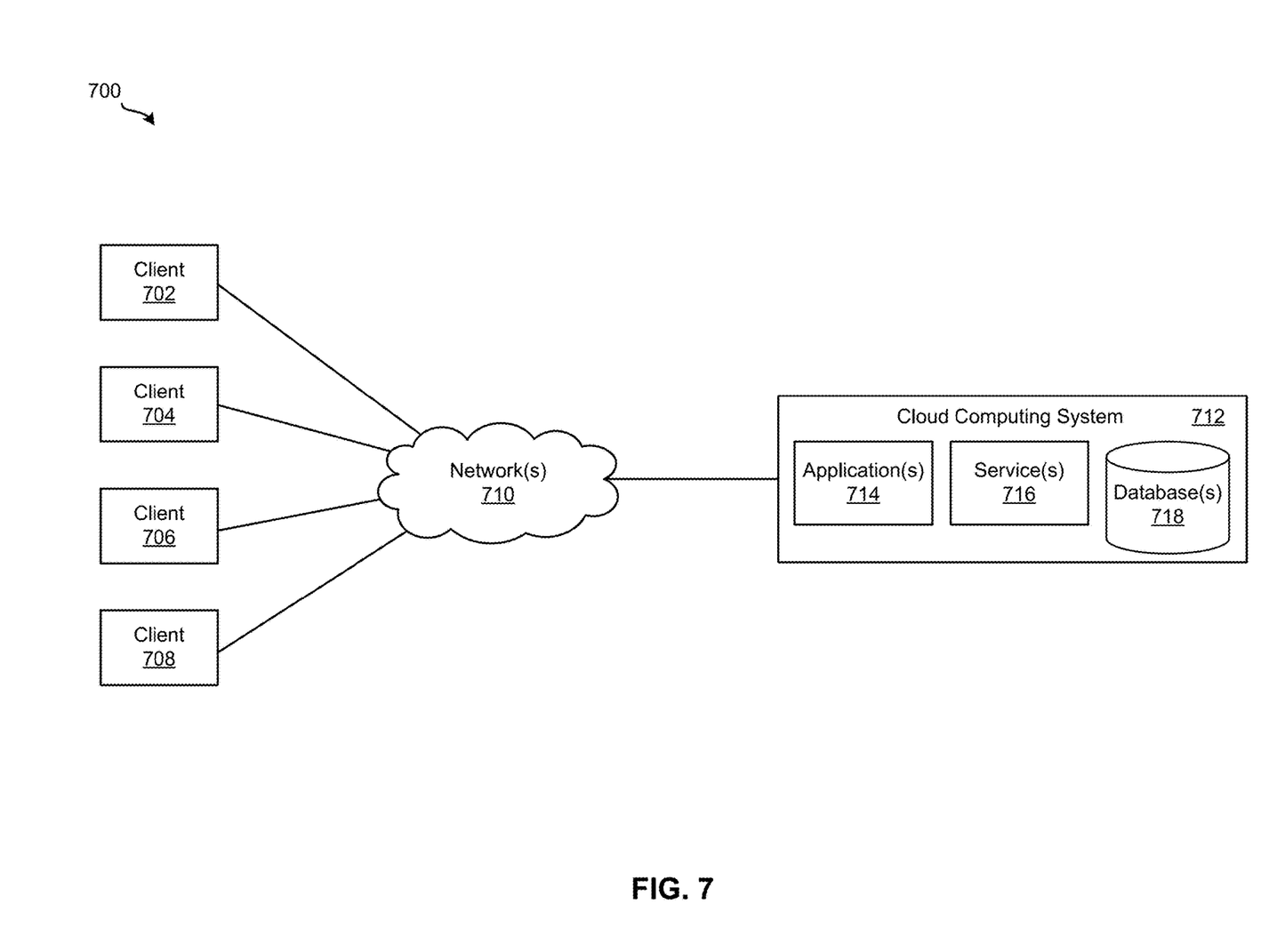
FIG. 7 illustrates an exemplary system, in which various embodiments may be implemented.

FIG. 7 illustrates an exemplary system 700 for implementing various embodiments described above. For example, one of client devices 702-708 may be used to implement client device 105 and cloud computing system 712 may be used to implement computing system 110. As shown, system 700 includes client devices 702-708, one or more networks 710, and cloud computing system 712. Cloud computing system 712 is configured to provide resources and data to client devices 702-708 via networks 710. In some embodiments, cloud computing system 700 provides resources to any number of different users (e.g., customers, tenants, organizations, etc.). Cloud computing system 712 may be implemented by one or more computer systems (e.g., servers), virtual machines operating on a computer system, or a combination thereof.

As shown, cloud computing system 712 includes one or more applications 714, one or more services 716, and one or more databases 718. Cloud computing system 700 may provide applications 714, services 716, and databases 718 to any number of different customers in a self-service, subscription-based, elastically scalable, reliable, highly available, and secure manner.

In some embodiments, cloud computing system 700 may be adapted to automatically provision, manage, and track a customer's subscriptions to services offered by cloud computing system 700. Cloud computing system 700 may provide cloud services via different deployment models. For example, cloud services may be provided under a public cloud model in which cloud computing system 700 is owned by an organization selling cloud services and the cloud services are made available to the general public or different industry enterprises. As another example, cloud services may be provided under a private cloud model in which cloud computing system 700 is operated solely for a single organization and may provide cloud services for one or more entities within the organization. The cloud services may also be provided under a community cloud model in which cloud computing system 700 and the cloud services provided by cloud computing system 700 are shared by several organizations in a related community. The cloud services may also be provided under a hybrid cloud model, which is a combination of two or more of the aforementioned different models.

In some instances, any one of applications 714, services 716, and databases 718 made available to client devices 702-708 via networks 710 from cloud computing system 700 is referred to as a "cloud service." Typically, servers and systems that make up cloud computing system 700 are different from the on-premises servers and systems of a customer. For example, cloud computing system 700 may host an application and a user of one of client devices 702-708 may order and use the application via networks 710.

Applications 714 may include software applications that are configured to execute on cloud computing system 712 (e.g., a computer system or a virtual machine operating on a computer system) and be accessed, controlled, managed, etc. via client devices 702-708. In some embodiments, applications 714 may include server applications and/or mid-tier applications (e.g., HTTP (hypertext transport protocol) server applications, FTP (file transfer protocol) server applications, CGI (common gateway interface) server applications, JAVA server applications, etc.). Services 716 are software components, modules, application, etc. that are configured to execute on cloud computing system 712 and provide functionalities to client devices 702-708 via networks 710. Services 716 may be web-based services or on-demand cloud services.

Databases 718 are configured to store and/or manage data that is accessed by applications 714, services 716, and/or client devices 702-708. For instance, storages 135 and 140 may be stored in databases 718. Databases 718 may reside on a non-transitory storage medium local to (and/or resident in) cloud computing system 712, in a storage-area network (SAN), on a non-transitory storage medium local located remotely from cloud computing system 712. In some embodiments, databases 718 may include relational databases that are managed by a relational database management system (RDBMS). Databases 718 may be a column-oriented databases, row-oriented databases, or a combination thereof. In some embodiments, some or all of databases 718 are in-memory databases. That is, in some such embodiments, data for databases 718 are stored and managed in memory (e.g., random access memory (RAM)).

Client devices 702-708 are configured to execute and operate a client application (e.g., a web browser, a proprietary client application, etc.) that communicates with applications 714, services 716, and/or databases 718 via networks 710. This way, client devices 702-708 may access the various functionalities provided by applications 714, services 716, and databases 718 while applications 714, services 716, and databases 718 are operating (e.g., hosted) on cloud computing system 700. Client devices 702-708 may be computer system 500 or computing device 600, as described above by reference to FIGS. 5 and 6, respectively. Although system 700 is shown with four client devices, any number of client devices may be supported.

Networks 710 may be any type of network configured to facilitate data communications among client devices 702-708 and cloud computing system 712 using any of a variety of network protocols. Networks 710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
receiving from a client device a request for objects in a collection of objects and a set of keywords;
using a neural network model to map the set of keywords to a set of product categories;
using the neural network model to generate a set of confidence scores for at least a portion of mappings of keywords to product categories;
generating a search query based on the set of keywords and the set of product categories, wherein the search query is configured to identify objects in the collection of objects having a description or name that matches at least one keyword in the set keywords and modify relevance of identified objects based on the set of product categories and based on the set of confidence scores for the at least a portion of mappings of keywords to product categories;
executing the search query on the collection of objects to generate a result set of objects; and
providing the result set of objects to the client device.

2. The non-transitory machine-readable medium of claim 1, wherein the neural network model is trained based on a set of events that have occurred, each event in the set of events comprising a set of keywords, a particular collection of objects, an object in the particular collection of objects, and an action performed on the object.

3. The non-transitory machine-readable medium of claim 1, wherein an application receives the request for objects, the application sends the request and the set of keywords to a mapping engine, the mapping engine using the neural network model to map the set of keywords to the set of product categories, the application sends the set of keywords, the set of product categories, and the set of confidence scores to a query generator, the query generator generating the search query, the query generator sends the search query to a query processor, the query processor executing the search query.

4. The non-transitory machine-readable medium of claim 1, wherein the objects in the result set of objects are ordered according to relevance as modified based on the set of confidence scores for the at least a portion of mappings of keywords to product categories, wherein a higher confidence score causes an object to have a lower ordering in the result set of objects than a lower confidence score.

5. The non-transitory machine-readable medium of claim 1, wherein the search query is configured to modify the relevance of identified objects associated with product categories that match a product category in the set of product categories mapped by the neural network model.

6. The non-transitory machine-readable medium of claim 1, wherein the search query is configured to modify relevance of objects in the result set of objects by increasing the relevance of objects having commodity codes that match at least one product category in the set of product categories.

7. The non-transitory machine-readable medium of claim 6, wherein increasing the relevance of the objects having product categories that match at least one product category in the set of product categories comprises increasing the relevance of the objects based on a defined weight value.

8. A method, executable by a device, comprising:
receiving from a client device a request for objects in a collection of objects and a set of keywords;
using a neural network model to map the set of keywords to a set of product categories;
using the neural network model to generate a set of confidence scores for at least a portion of mappings of keywords to product categories;
generating a search query based on the set of keywords and the set of product categories, wherein the search query is configured to identify objects in the collection of objects having a description or name that matches at least one keyword in the set keywords and modify relevance of identified objects based on the set of product categories and based on the set of confidence scores for the at least a portion of mappings of keywords to product categories;
executing the search query on the collection of objects to generate a result set of objects; and
providing the result set of objects to the client device.

9. The method of claim 8, wherein the neural network model is trained based on a set of events that have occurred, each event in the set of events comprising a set of keywords, a particular collection of objects, an object in the particular collection of objects, and an action performed on the object.

10. The method of claim 8, wherein an application receives the request for objects, the application sends the request and the set of keywords to a mapping engine, the mapping engine using the neural network model to map the set of keywords to the set of product categories, the application sends the set of keywords, the set of product categories, and the set of confidence scores to a query generator, the query generator generating the search query, the query generator sends the search query to a query processor, the query processor executing the search query.

11. The method of claim 8, wherein the objects in the result set of objects are ordered according to relevance as modified based on the set of confidence scores for the at least a portion of mappings of keywords to product categories, wherein a higher confidence score causes an object to have a lower ordering in the result set of objects than a lower confidence score.

12. The method of claim 8, wherein the search query is configured to modify the relevance of identified objects associated with product categories that match a product category in the set of product categories mapped by the neural network model.

13. The method of claim 8, wherein the search query is configured to modify relevance of objects in the result set of objects by increasing the relevance of objects having commodity codes that match at least one category in the set of product categories.

14. The method of claim 13, wherein increasing the relevance of the objects having product categories that match at least one product category in the set of product categories comprises increasing the relevance of the objects based on a defined weight value.

15. A system comprising:
a set of processing units; and
a non-transitory machine-readable medium storing instructions that when executed by at least one processing unit in the set of processing units cause the at least one processing unit to:
receive from a client device a request for objects in a collection of objects and a set of keywords;
use a neural network model to map the set of keywords to a set of product categories;
use the neural network model to generate a set of confidence scores for at least a portion of mappings of keywords to product categories;
generate a search query based on the set of keywords and the set of product categories, wherein the search query is configured to identify objects in the collection of objects having a description or name that matches at least one keyword in the set keywords and modify relevance of identified objects based on the set of product categories and based on the set of confidence scores for the at least a portion of mappings of keywords to product categories;
execute the search query on the collection of objects to generate a result set of objects; and
provide the result set of objects to the client device.

16. The system of claim 15, wherein the neural network model is trained based on a set of events that have occurred, each event in the set of events comprising a set of keywords, a particular collection of objects, an object in the particular collection of objects, and an action performed on the object.

17. The system of claim 15, wherein an application receives the request for objects, the application sends the request and the set of keywords to a mapping engine, the mapping engine using the neural network model to map the set of keywords to the set of product categories, the application sends the set of keywords, the set of product categories, and the set of confidence scores to a query generator, the query generator generating the search query, the query generator sends the search query to a query processor, the query processor executing the search query.

18. The system of claim 15, wherein the objects in the result set of objects are ordered according to relevance as modified based on the set of confidence scores for the at least a portion of mappings of keywords to product categories, wherein a higher confidence score causes an object to have a lower ordering in the result set of objects than a lower confidence score.

19. The system of claim 15, wherein the search query is configured to modify the relevance of identified objects associated with product categories that match a product category in the set of product categories mapped by the neural network model.

20. The system of claim 15, wherein the search query is configured to modify relevance of objects in the result set of objects by increasing the relevance of objects having commodity codes that match at least one category in the set of product categories.

* * * * *